United States Patent [19]
Viswanathan et al.

[11] Patent Number: 5,936,659
[45] Date of Patent: Aug. 10, 1999

[54] METHOD FOR VIDEO DELIVERY USING PYRAMID BROADCASTING

[75] Inventors: Subrama Rishnarathamamngalam Viswanathan, Morristown; Tomasz Imielinski, North Brunswick, both of N.J.

[73] Assignee: Telcordia Technologies, Inc., Morrisotwn, N.J.

[21] Appl. No.: 08/792,304

[22] Filed: Jan. 31, 1997

Related U.S. Application Data

[60] Provisional application No. 60/010,915, Jan. 31, 1996.

[51] Int. Cl.$^6$ .................................................. H04N 7/173
[52] U.S. Cl. .................................. 348/7; 455/4.2
[58] Field of Search .................................. 348/7, 12, 13; 455/4.2, 5.1; 395/200.49, 200.48, 200.47; H04N 7/173

[56] References Cited

U.S. PATENT DOCUMENTS 5,751,336  5/1998  Aggarwal et al. ......................... 348/7

*Primary Examiner*—Chris Grant
*Attorney, Agent, or Firm*—Joseph Giordano; David A. Hey; Elizabeth A. Mark

[57] ABSTRACT

A method for broadcasting movies within channels of a wide band network by breaking the communications path into a number of logical channels and breaking each movie up into a number of segments of increasing size. The first segment of each movie is the smallest segment is transmitted in sequence over the first logical channel and repeated. The second segment of each movie which is proportionately larger than the first segment of each movie is transmitted in sequence over the second logical channel and repeated. This is repeated for the total number of segments which equals the total number of logical channels. The segments are broadcast in such a way that, once the first segment is received at a client location, the subsequent segments are also received in time, so that the movie can be viewed continuously.

7 Claims, 2 Drawing Sheets

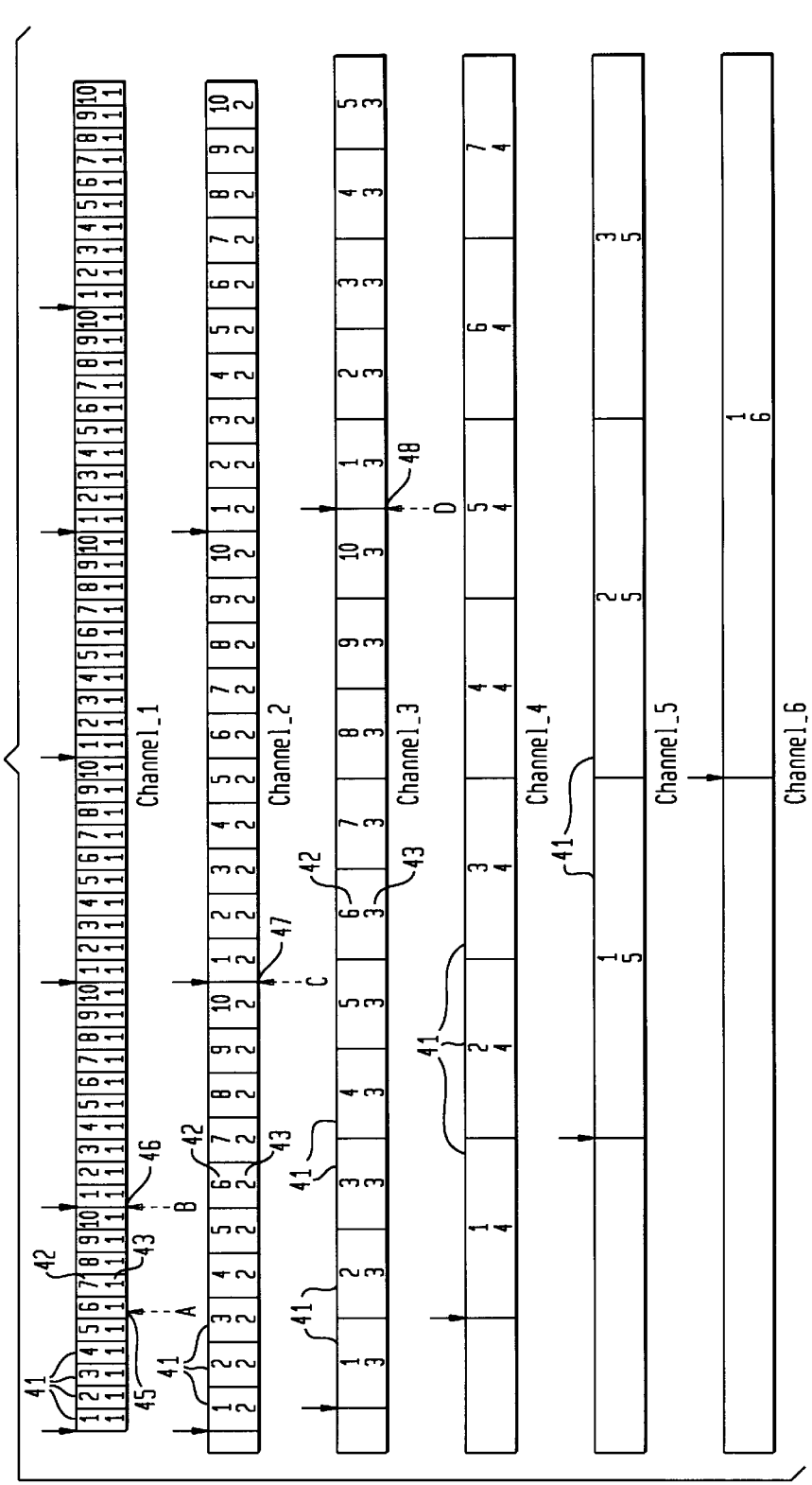

METHOD FOR VIDEO DELIVERY USING PYRAMID BROADCASTING

CROSS REFERENCE TO RELATED PROVISIONAL APPLICATION

This application is related and claims priority to a provisional patent application with Ser. No. 60/010915 entitled "Method and System for Video Delivery Using Pyramid Broadcasting" filed on Jan. 31, 1996.

TECHNICAL FIELD OF THE INVENTION

Our invention relates to the field of Wide Area Networking and more specifically to the field of Video on Demand Services.

BACKGROUND OF THE INVENTION

The delivery of information programs, such as video entertainment and educational programs, to viewers has largely been provided through a few well known technologies, such as broadcast television, cable television, and satellite broadcast television. A limitation of these conventional technologies is that they are not conducive to allowing customer control of the choice of programming and time of program delivery. Viewers receive programs substantially as selected, scheduled and transmitted by the content providers. In response to these limitations and as a result of the development of the video cassette recorder, video rental stores have proliferated across the nation. These stores provide viewers with a greater variety in progam choices and provide the viewers with the flexibilty to watch these videos at their convenience. However, viewers still have to endure the inconvience of picking up the program from the video rental store and returning it by a certain date and time. In view of these shortcomings and in response to the development of wide band telecommuncations technologies, many in the telecommunications industry have been developing systems and architectures for Video-on-Demand (VOD) services.

One such example of a video on demand network service architecture is described in U.S. Pat. No. 5,371,532 entitled "Communications Architecture and Method for Distributing Information Services", Dec. 6, 1994.

Advances in network technologies will contribute to the realization of the VOD service over wide area networks (W. D. Sincoskie, "System Architecture for Large Scale Video on Demand Service," Computer Network and ISDN systems, pp. 155–162, (1991), P. Venkatan Rangan, H. M. Vin and S. Ramanathan, "Designing an On-Demand Multimedia Service," IEEE Communication Magazine, Vol. 30, pp 5–65, July 1992). The market success of any VOD service is dependant on the choice of video information available to a VOD subscriber and the ability of such videos to be delivered to clients in a continuous fashion without interruption. Such designs require a video service capable of servicing a number of simultaneous requests (Banu Ozode, Alexandros Biliris, Rajeev Rastogi and Avi Silbershatz, "A Low-cost Storage Service for Movie on Demand Databases," Proceedings of the 20th Very Large DataBases (VLDB) Conference, Santiago, Chile, 1994). A key performance measurement of a VOD service is the maximum time a viewer has to wait when the viewer makes a request to see a movie and when that movie is available to be viewed. This measurement is known as access time.

It is anticipated that a VOD service will be deployed using a client/server computer architecture. A VOD customer will have at his customer premises a device that would be a multimedia client in this client/server VOD architecture. This multimedia client would typically be a workstation or a powerful PC with capablities of receiving and decompressing digital video from a VOD server, storing the video in its secondary storage, and concurrently playing it from storage at a predefined rate. An example client machine is a Silicon Graphics Indy worksation with a 100 MHz MIPS R4000 processor and a Scientific Atlanta add-in board for decompression and analog signal processing. The underlying network can be any network techonology that supports multicasting (i.e. broadcasting on specific channels).

One of the difficulties in designing a responsive VOD service architecture is that most of the demand (80%) is for a few (10 to 20) very popular movies. As an example, a typical video rental store may have as many as fifty copies of each of the top 20 movies and no more than two, on average, of the rest of the titles. How do you design a client server architecure model that would permit 80% of the users at any one time to have rapid access to a small number movies stored on the system while still maintaining a large variety of movies to select from?

One solution that addresses this problem is a three-tiered video server as proposed by Oracle Corporation. Under this three tiered scheme, the dozen or so most popular releases will be always loaded into the first tier, the main memory of the server computer. This would give thousands of viewers quick access to the digital files that get used the most. The second tier would be kept on 1000 or more hard storage disks inside the server, containing about 200 of the next-most-popular movies. The third tier, reserved for lower-demand movies requested only occasionally, would be a separate machine—a "video jukebox" with tens of thousands of 8-millimeter digital tapes, each containing a single movie. When a viewer requests an archived title, a robotic arm would grab the cassette and load it into the video servers memory bank. The Christmas classic "Its a Wonderful Life" is a good exampler example of a movie that might rotate among all three tiers. Most of the year the movie will not be in high demand and therefore it would make sense to keep it stored in the video juke-box. Then around the Christmas season, it would be appropriate to load it onto the hard drives in tier 2 in anticipation of the increase in requests. During times of real heavy demand such as on Christmas Eve, it can be store in the computers memory as part of the first tier.

A modification to this approach is to broadcast over the wide area network the movies stored in the first tier rather then provide them at the request of the subscriber using the client server approach, because the broadcasting approach is best able to scale up to handle the increase usage such as during "prime time" (say between 7 pm and 11 pm). As an example, if the number of viewers desiring to see a movie in the first tier increases 10 fold, using the broadcast approach for the first tier will enable all the viewers to receive the movie within the same access time versus the requests being queued and requiring processing by the server. In the broadcasting model, the user's request for a particular movie does not have to be transmitted to the server. The user (client) just waits until the movie of choice is downloaded to the users machine from within the broadcast batch of movies on the newtork. No explicit request to the server then is made for any movie. These requests are handled at the user's machine (client end) instead of being handled at the server end. Such a VOD service can be rendered as follows:

During prime time, the broadcasting approach is used for the popular movies, those in the first tier, and rest of the movies, those in the second and third tiers, are provided by the client-server model.

During all other times, all the movies are provided by the client-server model.

However, broadcasting movies requires large bandwidths to maintain quick user access times. Key parameters for determining the access time performace of a VOD system are the consumption rate, as the bandwidth of the channel and the number of movies that will be broadcasted. A consumption rate is defined the rate of "b" bits (frames)/second for continuous viewing of the movie. In other words, at least b bits (frames) have to be delivered at the client every second. The bandwidth "B" of the is channel is a defined as the number of "b" bits over which M number of movies are transmitted each having size D. For our purposes the bandwidth is dimensionless value defined relative to the consumption rate. In other words, a bandwidth of B equal to 10 indicates that the bit rate of the channel is 10 times as much as the consumption rate of a movie. The size D of a movie will be measured as the viewing (consumption) time for the entire movie. For example, the size of the typical movie is equal to 100 minutes. Thus, with B equal to 10, assuming no compression, it will take 10 minutes to physically send such a typical movie over the channel. In general, the broadcasting time over a channel with bandwidth B is equal to B/D.

There are two conventional broadcasting methodologies known in the art. Using the first methodology, M movies are broadcast on a channel in their entirety, one after another. Thus the access time for any movie is (M*D)/B; where M is the number of movies, D is the average length of the movies, and B is the relative bandwidth of the communicaitons channel. Under the second methodology, a physical channel is considered to be divided into B logical channels. A replica of each movie is broadcast on different logical channes with a phase dely of "d" time units. There are D/d logical channels for each movie. On each logical channel, one movie is broadcast periodically at its consumption rate, in its entirety. In this way, any client can start viewing the movie in at most "d" time units (by tuning into one of the D/d logical channels). The total available bandwidth B is divided equally among the M movies. Each movie has a bandwidth of B/M allocated to it. Since each channel has a bandwidth equal to the consumption rate of a movie, D/d equal B/ M. Any client requesting a movie can tune into the appropriate channel and begin viewing the movie in not more than d=(M*D)/B time units. Thus, the access time is (M*D)/B.

Note that both broadcasting methods have the same access time and that as the bandwidth B increases, the access time decreases lineraly. Or as the number of movies broadcasted increases, the access time increases lineraly. However, as VOD service networks are developed and deployed to serve an ever increasing constintuency and broadcast a greater number of movies there is a need to reduce the access time more than at the linear rate that is provided with improvments in bandwidth. It is therefore the object of our invention to provide a method for broadcasting movies over a wide band network with an improvment in access time over that provided by the current art.

SUMMARY OF THE INVENTION

Our invention is a method for broadcasting movies within channels of a wide band network by breaking the communications path into a number of logical channels and breaking each movie up into a number of segments of increasing size. The first segment of each movie is the smallest segment and is transmitted in sequence over the first logical channel repetitively. The second segment of each movie is proportionately larger than the first segment of each movie and is transmitted in sequence over the second logical channel repetitively. This is repeated for the total number of segments which equals the total number of logical channels. The frequency of transmitting each segment decreases with the increase in the segment's size. The segments are broadcast in such a way that, once the first segment is received, the subsequent segments are also received in time, so that the movie can be viewed continuously. While the first segment is being consumed, the second segment is collected. This process of collecting future segments while consuming the current segment is continued till the whole movie is collected. As a result of our inventive method, the access time is merely the time to access the first segment. Since the first segment is the smallest and it is also broadcast the maximum number of times, the access time for the first segment is very small. We have named this process "Pyramid Broadcasting".

BRIEF DESCRIPTION OF THE DRAWINGS

FIG. 3 illustrates an example of access time or a prior art broadcast method.

FIG. 4 illustrates and example of access time using our invention.

DETAILED DESCRIPTION

A. Pyramid Broadcasting Method

Figure 1:
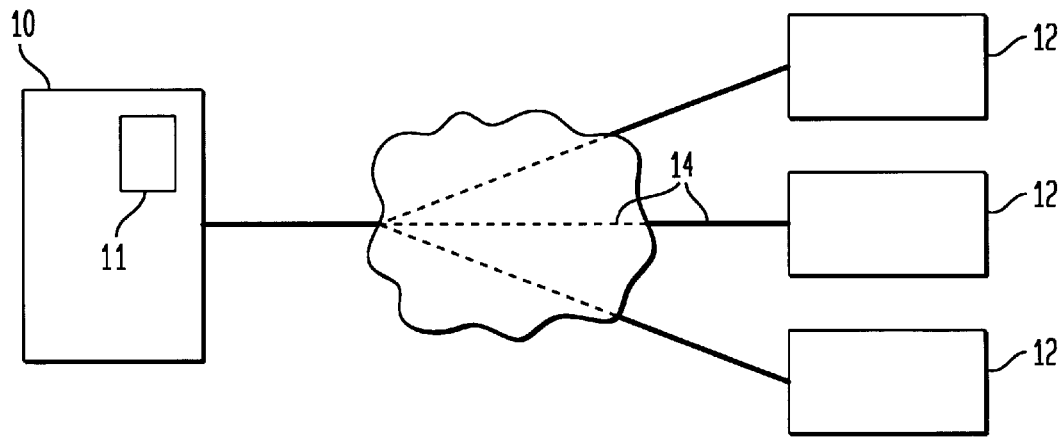
FIG. 1 illustrates a typically VOD service client server architecture.
Figure 2:
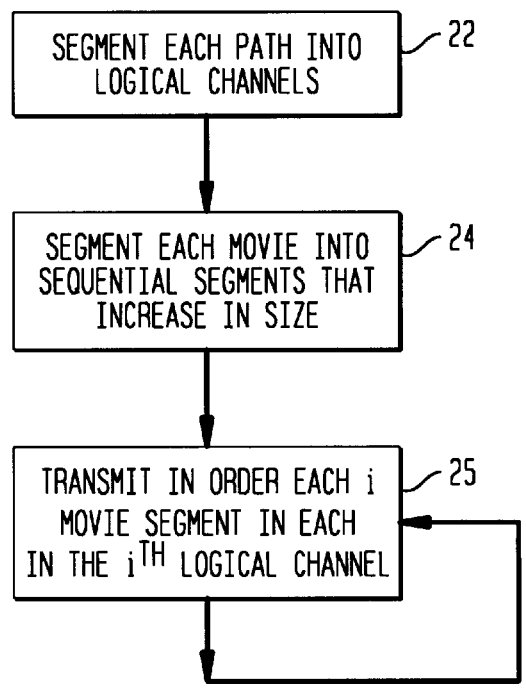
FIG. 2 depicts a flow diagram of our invention.

Our invention is described using the illustrative network depicted in FIG. 1 in accordance with the method as depicted in the flow diagram in FIG. 2. Our method requires certain steps to be executed by the server 10 in conjuction with steps to be executed by the client machine 12. The first step 22 in our method is the implementation of a protocol to divide the communications path 14 between the VOD server 10 and the client 12 into K logical channels. In the second or server step 24, each movie stored in the server's 10 memory 11 is divided into K segments. The movie segments are of sizes $D_i$ with i equal 1, . . . K, where D equals the concatenation of segments $D_1$, $D_2$, . . . , $D_k$ in the order of increasing segment numbers. The size of segment $D_{i+1}$ is proportionately larger (times some defined constant $\alpha$) than the size of $D_i$, where $\alpha$ denotes the ratio between the size of segments between two adjacent channels. The parameter $\alpha$ is chosen in such a way the contiguous viewing is assured and is based on the Continuity Principal which states that the consumption time of $D_i$ is greater than or equal to the upper bound (worst case) of the access time for segment $D_{i+1}$ on the i+1th channel which has a bandwidth of B'. Since $D_{i+1}$ equal $\alpha$ times $D_i$ and the access time of $D_{i+1}$ in the channel of bandwidth B' equals ($D_{i+1}$ *M) /B', $\alpha$ is less than or equal to B/(M+K). Therefore, $\alpha$ should be set to be equal to B/(M*K). In the final server step 25, each segment of $D_i$ is transmitted on channel i and the segment of $D_i$ of all the M movies are broadcast together in a sequence with the sequence constantly repeated.

In the client machine 14, the first segment $D_1$ of the movie selected by the user is downloaded and consumed. Then all of the subsequent segments are retrieved from the channel and stored in memory in the client.

B. Illustrative Example of Our Inventive Method

Consider a VOD service with the number of most popular movies (M) equal to ten. Let the duration (D) of each movie be two hours i.e. one hundred and twenty minutes. Also, let the consumption rate of the movie be fifty megabits per second, and let the bandwidth of the broadcast channel be equal to 6 gigabits per second. Thus, the channel bandwidth B as a multiple of the consumption rate of the movie is equal to (6 Gbps)/(50 Mbps) or one hundred and twenty.

In conventional prior art broadcasting, each movie is broadcast in sequence in its entirety, i.e. movie1, movie2, . . . , movie10, on the channel. With a bandwidth of six Gbps, each movie will take one minute to be broadcast. The access time is the total for broadcasting the ten movies i.e. ten minutes. FIG. 3 illustrates the channel allocation for conventional broadcasting. Each movie is transmitted in a block 30. At reference point 32 all ten movies have been broadcasted. The line 34 depicts the access time.

Using our invention and deciding to break each movie into 6 segments, we compute $\alpha$ to be equal to two (i.e. B/(M*K). FIG. 4 illustrates how movies are multiplexed on the channels using our invention. With $\alpha$ equal to two each segment is double the size of the next segment. The first segment contains two minutes of the movie, the second segment contains the next four minutes, the third segment contains the next eight minutes, the fourth segment contains the next sixteen minutes, the fifth the next thirty-two minutes, and the sixth segment contains the last sixty-four minutes.

In FIG. 4, each movie segment is denoted by a rectangle 41. The upper number 42 inside the rectangle 41 denotes the movie number and the lower number 43 refers to the segment number within a movie. The shifts between the broadcasting of the segments on adjacent channels that is shown in the figure, is only for illustrating the scheme. The pyramid broadcasting scheme will work even if these shifts are not maintained.

In FIG. 4 point A (45) denotes the point of time when a client made a request for the first movie. Point B (46) denotes the time when the client begins to download the first segment of the movie. Points C (47) and D (48) denote the points of time when the client begins downloading the second and third segment respectfully. In this example the client downloads the subsequent segment (in the second and third channels) when it is halfway through consuming a segment.

The bandwidth of each channel is 1 Gbps (as expressed in terms consumption rate of the movie, the bandwidth of each channel is 20). The size of the first segments are 2 minutes each. The first segment of each movie will be broadcast in duration (2 minutes) /20 which equals 0.1 minutes. There are 10 movies and the first segments of all the 10 movies will be broadcast in 1 minute. Thus the access time for any movie is 1 minute.

With a bandwidth of 6 Gbps, the access time using our invention is 1 minute, whereas the access time using conventional broadcasting is 10 minutes. Our invention results in an access time that is 10 times smaller. To achieve an access time of 1 minute using prior art broadcasting, a bandwidth of 60 Gbps is required. Using pyramid broadcasting, the bandwidth required for the same access time is just 6 Gbps, a saving of 54 Gbps.

C. Illustrative Implementation

We have trialed our invention using one Sun workstation as a server, another Sun workstation as a client, and an ethernet network connecting the servers as the wide band network for delivery of the VOD services. Local disks were used as the buffer for storing the future data segments. 38.4 Kbps audio objects and MPEG compressed video objects were used as data objects. All of the video objects were of the same size. The user selects video objects or songs from a menu-driven interface. The selection has to be homogeneous, i.e. all video objects or all audio objects. The number of channels to be opened and the total bandwidth are also provided as inputs.

In the Sun workstation acting as the server, the control files were created. The control files store the header that will be send out with the data on each channel. The Alpha ($\alpha$) is computed using the input parameters and each object was divided into data segments of the appropriate size to be put in each logical channel. For each channel, a broadcasting process was forked, which in turn opens the socket and periodically downloads the corresponding data segment (of all the selected objects). Flow control is maintained using the "usleep" command after a fixed number (10) of packets.

In the client work station, a client interface was opened on a machine indicating to the server to send the control information (i.e. the socket "ids" to listen to, and the order in which to listen) to the client. (Alternatively, there can be a control channel where the directory is broadcast and the clients can download the control information from this channel). Two processes were forked, one read the current socked (channel) and the other read the next socket. The parent opened a pipe into the play/mpeg_play process and writes the data from each socket into the pipe.

Working with bandwidths from 614 Kbps to 2,456 Kbps and four video objects with consumption rate of 38.4 kbps, the access time using our invention was typically ten times smaller than the access times of tranditionally broadcast systems.

D. Conclusion

Numerous other embodiments of our invention may be devised without departure from the spirit and scope of the following claims. Although this invention was described using a video on demand service, the method is equally applicable to any wide band network service where users can request information which is best provided by a continuous data flow and where user access time must be kept to a minimum.

We claim:

1. A method for delivering movies in a Video-on-Demand system comprising the steps of
   segmenting a physical communications path between a Video-on-Demand server and a Video-on-Demand client into logical channels;
   segmenting each movie to be broadcast into multiple sequential segments of increasing sizes; and
   transmitting the first and smallest segments of each movie multiple times in the first of said logical channels.

2. The method of claim 1 wherein said multiple segments of increasing sizes of each movie increases geometrically.

3. The method of claim 1 further comprising the steps of:
   receiving at said Video-on-Demand client the first of said movie segments;
   playing said said first movie segment; and
   concurrently with said playing step, receiving and storing said sequential movie segments.

4. The method of claim 1 further comprising the steps of transmitting sequential segments in subsequent of said logical channels.

5. A method of broadcasting a plurality of information objects between two computers in a client server computer archtecture, said method comprising the steps of:
   establishing a communications channel between a client computer and a server computer over a network;
   dividing said communications channel into logical channels;
   segmenting each of said information objects into data segments;

recursively transmitting the first of said data segments for each of said information objects on the first of said logical channels; and recursively transmitting the second of said data segments of each of said information objects on the second of said logical channels.

6. The method as recited in claim 5 wherein the said first data object produced by said segmenting step is the smallest data object for each information object and each of said data objects produced in sequence is progressively larger than its predecessor data object.

7. The method of claim 6 wherein each of said data objects produced in sequence is double the size of its predecessor data object.

* * * * *